W. J. THEIS.
VALVE.
APPLICATION FILED SEPT. 12, 1908.
987,334.
Patented Mar. 21, 1911.
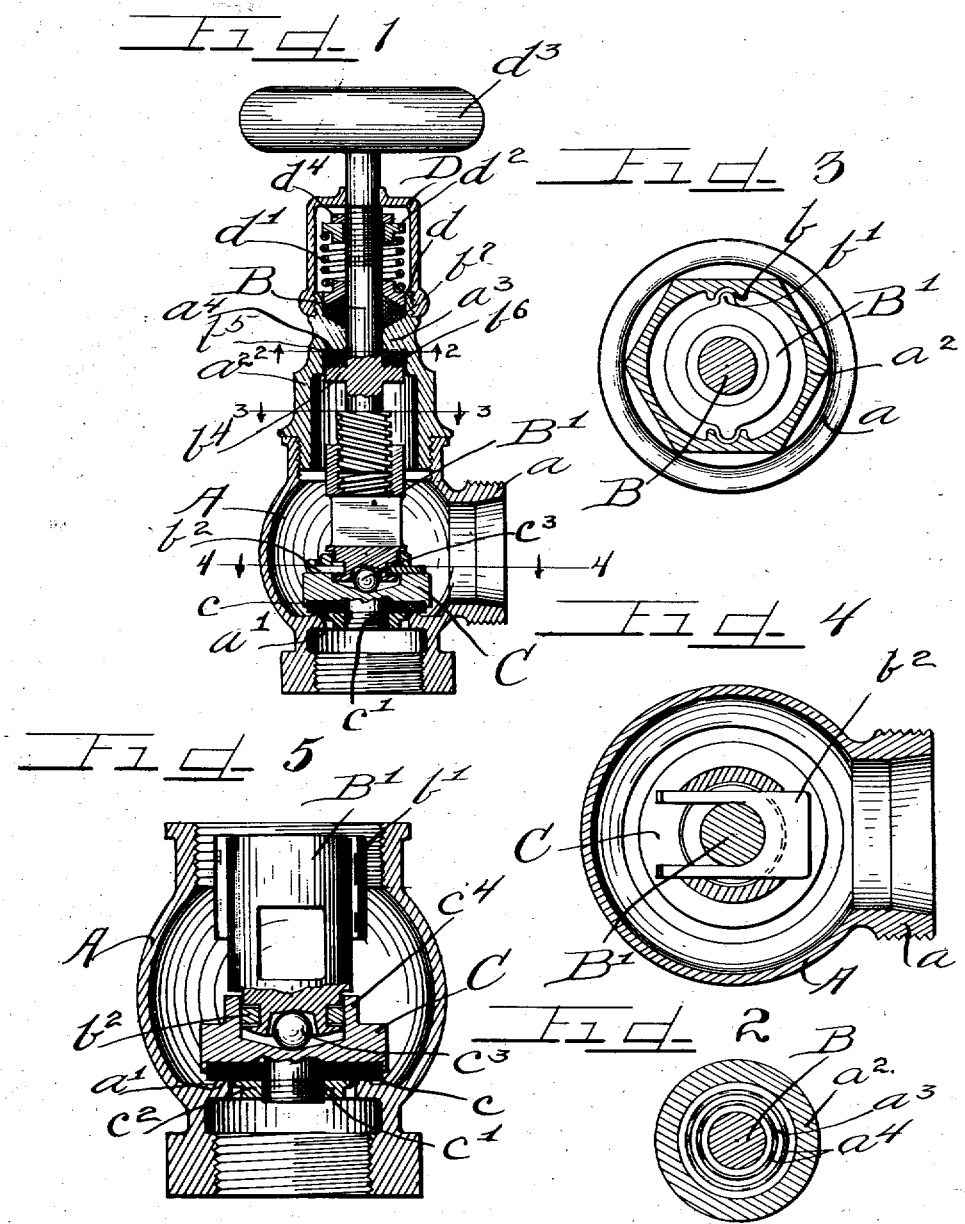

UNITED STATES PATENT OFFICE.

WILLIAM J. THEIS, OF CHICAGO, ILLINOIS, ASSIGNOR TO MANUFACTURERS EQUIPMENT COMPANY, A CORPORATION OF ILLINOIS.

VALVE.

987,334. Specification of Letters Patent. Patented Mar. 21, 1911.

Application filed September 12, 1908. Serial No. 452,746.

*To all whom it may concern:*

Be it known that I, WILLIAM J. THEIS, a citizen of the United States, and a resident of the city of Chicago, in the county of Cook and State of Illinois, have invented certain new and useful Improvements in Valves; and I do hereby declare that the following is a full, clear, and exact description of the same, reference being had to the accompanying drawings, and to the letters of reference marked thereon, which form a part of this specification.

This invention relates more particularly to that class of pressure resisting valves wherein it is desirable to close positively against steam or other pressure, and although said pressure may be considerable, yet to insure positive closure with equal pressure on all parts of the seat and quick release when desired.

Of the numerous valves heretofore devised for the various purposes for which valves are adaptable, usually the closure is carried more or less rigidly upon the valve stem with the effect that in closing the valve a rotative, grinding effect to a greater or less extent, occurs, soon destroying the packing and necessitating renewal. Such renewals cannot readily be made at all times, however, and in consequence, considerable loss from imperfect closure of the valve which cannot be readily remedied occurs until the plant is shut down.

The object of this invention is to afford a quick and easy closing valve adapted to positively seat the closure without rotation thereof on the seat, but to afford nevertheless a perfect adaptation to the seat and without rotating the closure thereon, thus obviating one of the most common causes of wear.

It is also an object of the invention to afford in a valve having a unitary stem and closure supported on and secured to the stem by means affording a ball bearing on which the stem may rotate freely when forcing the closure to its seat or when retracting the closure, thus by affording a minimum surface friction enabling the valve to be opened although subjected to any pressure.

It is finally an object of the invention to afford an exceedingly cheap, simple and durable construction consisting of comparatively few parts, none of which can readily get out of order.

The invention consists in the matters hereinafter described and more fully pointed out and defined in the appended claims.

In the drawings: Figure 1 is a central vertical section of a valve embodying my invention. Fig. 2 is an enlarged section taken on line 2—2 of Fig. 1. Fig. 3 is an enlarged section taken on line 3—3 of Fig. 1. Fig. 4 is an enlarged section taken on line 4—4 of Fig. 1. Fig. 5 is an enlarged detail in vertical section of the valve casing and the closure.

As shown in the drawings: A, indicates the valve casing, which may be of the usual or globular form, having a threaded inlet aperture at the lower end and an externally threaded pipe connection $a_1$ for the discharge. Said casing is provided, as shown in its bottom, with a raised, annular seat $a'$, at a point corresponding approximately with the bottom of the outlet aperture. The upper end of said casing is open and of a size to permit the closure and parts to be inserted therethrough and is internally threaded to receive a cap $a^2$, thereon. Said cap $a^2$, is externally screw threaded at its upper end and below its upper end is provided with a transverse partition $a^3$, having a central aperture and through which the valve stem B, extends, said partition $a^3$, being provided with concentric downwardly directed beads $a^4$, as shown two in number. On the upper side said partition is conical and concave to receive the packing hereinafter described.

The closure C, embraces a circular piece or plate of metal, usually cast, having a peripheral flange on its under side in which fits the packing washer $c$, and also provided on its under side and centrally with a downwardly directed, threaded stem $c'$, on which is secured a nut $c^2$, which bears against said packing washer $c$, and holds the same at all times from displacement. On its upper side, said closure is provided with an annular flange $c^4$, and within the flange is bored or countersunk to a point extending below the top of the closure, said bore or countersunk portion tapering downward from the sides to the middle to afford a positive seat for a supporting ball $c^3$, contained therein and usually constructed of bronze or other material that will not readily rust or deteriorate through use. Extending into said recess or bore in the top of the closure is a cylindric nut B′, having wings b′, which fit in complemental grooves b, in opposite sides of a cap $a^2$, to hold said nut at all times from rotation. Said nut is apertured transversely below the internally threaded portion thereof, and at its lower end (which is solid) is provided with a concave seat adapted to receive the ball $c^3$, before described, when seated in its recess in the closure. As shown, the lower or solid end of said nut is provided with a peripheral groove as shown in Figs. 1 and 5, adapted to receive the split key $b^2$, which is extended through slots in the flange $c^4$, thereby engaging the lower end of said nut or jointed extension yieldingly on the closure in a manner to permit the closure to adapt itself to the seat independently of the alinement of the extension or nut B′.

The stem B, is provided within the cap $a^2$, with an integral collar $b^4$, which is also provided with upstanding beads or rims $b^5$, corresponding with the beads $a^4$, before described, and secured on said stem between the collar and the partition $a^3$, is a packing washer $b^6$, of any suitable material adapted to prevent leakage through the cap at the stem orifice. As shown also, a packing $b^7$, of any suitable material is secured around the stem in the concave recess in the top of the cap and secured on the stem and bearing on said packing is a follower d, complementally concave on its under side with said partition $a^3$, and adapted to press said packing inwardly, as is usual with glands. A coiled spring d′, bears on said follower d, and at its upper end bears on a nut $d^2$, loose on the stem and adapted to be adjusted to vary the tension on the follower to compress the packing. As shown, a jam nut $d^4$, is threaded on the stem to adjust and hold said nut in adjusted position.

For the purpose, in parts, of affording an ornamental finish, a closing cap D, is threaded on the upper end of the cap $a^2$, and entirely conceals the spring and nuts, but may at any time be released to vary the adjustment of the tension of the spring d′. On the upper end of the valve stem is a hand wheel $d^3$, for actuating the valve, which is removably engaged on said stem in any suitable or usual manner.

The operation is as follows: In opening the valve the lead of the thread on the stem B, is such as to lift the closure to afford a full opening, with from one fourth to one half a full turn of the stem, thus affording a very quick opening and closing valve, though, of course, the lead of thread may vary in valves for different purposes. In closing the valve, the reverse rotation of the stem forces the nut and closure downwardly, and inasmuch as the pressure exerted by the stem on the closure is concentrated at the center of the closure, the downward pressure is thus equalized over the entire area of the closure bearing upon the seat and although the packing washer might be slightly thicker on one side than on the other, it adapts itself perfectly to the seat entirely closing the valve, and this will obviously be true though the flow of the fluid through the valve may have caused the closure to rotate slightly on its support, thus varying the position of the closure on the seat when again closed.

Owing to the perfect adaptation of the closure on the seat and the centralizing of the pressure thereon by means of a ball $c^3$, or any suitable ball shaped or rounded body, the valve can never stick, as its actual surface subjected to pressure is relatively very small and owing to its shape, permits of ready yielding without material friction.

Of course, I am aware that details of the construction may be varied and that the principle of operation disclosed may be embodied with various structures or equivalents to the other elements herein disclosed. I therefore do not purpose limiting this application for patent otherwise than necessitated by the prior art.

I claim as my invention:

1. A valve comprising a casing provided with a partition and an inlet and an outlet orifice, a stem extending into the casing through the partition, a rigid collar on the stem, on one side of the partition, a collar loosely engaged on the stem on the opposite side of the partition, a collar adjustable on the stem adjacent the loose collar, a spring interposed between said adjustable and loose collars, packing material between the rigid and loose collars and the partition, and a closure alined with the stem and having a swivel and oscillatable connection therewith.

2. In a device of the class described a casing provided with an inlet and an outlet, a seat between said inlet and outlet, a partition in the casing, an actuating stem extending therethrough, packing around the stem below and above the partition, collars on the stem, one bearing upwardly on the packing and one downwardly on the packing, a spring for forcing one collar downwardly and forcing the stem and other collar upwardly, a nut having threaded engagement with the lower end of the stem and a valve closure having a swivel connection with the nut.

3. In a device of the class described a casing provided with an inlet and an outlet, a seat between said inlet and outlet, a partition in the casing, an actuating stem extending therethrough, packing around the stem below and above the partition, collars on the stem one bearing upwardly on the packing and one downwardly on the packing, a spring for forcing one collar downwardly and forcing the stem and other collar upwardly, a nut having threaded engagement with the lower end of the stem, a valve closure having a swivel connection with the lower end of the nut, a friction ball between the end of the nut and closure permitting the closure adjusting itself to the nut irrespective of the alinement of the various parts.

4. In a device of the class described a casing provided with an inlet and an outlet, a seat between said inlet and outlet, a partition in the casing, an actuating stem extending therethrough, packing around the stem below and above the partition, collars on the stem, one bearing upwardly on the packing and one downwardly on the packing, a spring for forcing one collar downwardly and forcing the stem and other collar upwardly, a nut having threaded engagement with the lower end of the stem, a valve closure having a swivel connection with the nut, guides for the nut preventing rotation thereof and means permitting the closure automatically adjusting itself to firmly seat on the valve seat if the stem and nut are out of alinement therewith.

In testimony whereof I have hereunto subscribed by name in the presence of two subscribing witnesses.

WILLIAM J. THEIS.

Witnesses:
C. W. HILLS,
M. J. HAMPLIN.